United States Patent [19]

Tran et al.

[11] 3,956,634

[45] May 11, 1976

[54] LINEAR PARTICLE ACCELERATOR USING MAGNETIC MIRRORS

[75] Inventors: Duc Tien Tran; Dominique Tronc; Jacques Kervizic; Claude Perraudin, all of Paris, France

[73] Assignee: C.G.R.-Mev., Paris, France

[22] Filed: Jan. 31, 1975

[21] Appl. No.: 546,137

[30] Foreign Application Priority Data

Feb. 4, 1974 France .............................. 74.03657

[52] U.S. Cl. ............................. 250/396 R; 250/398; 250/493

[51] Int. Cl.[2] ....................... G01K 1/08; G21G 4/00; G21K 1/08

[58] Field of Search ...................... 250/396, 398, 493

[56] References Cited

UNITED STATES PATENTS 3,571,642 3/1971 Westcott ............................. 250/396

3,691,374 9/1972 Leboutet ............................. 250/396

*Primary Examiner*—Archie R. Borchelt
*Assistant Examiner*—T. N. Grigsby
*Attorney, Agent, or Firm*—Cushman, Darby & Cushman

[57] ABSTRACT

A particle accelerator for obtaining high energy particle beams, comprises an accelerating structure $S_A$, one mirror or two mirrors constituted with magnetic achromatic and stigmatic deviators and a source K of particles located at the entry of the accelerating structure $S_A$ and having an annular shape allowing the accelerated particles having passed twice through the accelerating structure $S_A$ to cross the source K, the axis of the source K being coincidental with the axis of the accelerating stucture $S_A$. Magnetic fields are determined in such a manner that the mirrors totally reflect the particles having a predetermined energy level and totally transmit the particles having an energy level higher than this predetermined energy level.

12 Claims, 4 Drawing Figures

LINEAR PARTICLE ACCELERATOR USING MAGNETIC MIRRORS

The present invention relates to a linear accelerator of charged particles being able to be used both in industrial and in medical apparatus when a particle beam of high energy is necessary, this improved linear accelerator making it possible, whilst achieving a reduction in size, to produce a high performance beam of accelerated particles.

An object of the present invention is a linear accelerator for accelerating a charged particle beam comprising a particle source, a linear accelerating structure constituted by a succession of resonant cavities, means for injecting electromagnetic energy into said structure; magnetic deflection means for deflecting said particle beam, said magnetic deflection means comprising at least a first achromatic and stigmatic magnetic mirror capable of reflecting said beam of particles in a direction which is at 180° to the incident direction of the beam, allowing said particle beam to pass at least twice through said accelerating structure; said particle source being arranged on the axis of said accelerating structure; and said particle source having a form such that it can be traversed along its axis by said accelerated beam having effects at least two passes through said accelerating structure.

For the better understanding of the invention and to show how the same may be carried into effect, reference will be made to the drawing accompanying the ensuing description and in which:

FIG. 1 illustrates an embodiment of a particle accelerator in accordance with the invention. This accelerator comprises:

Figure 1:
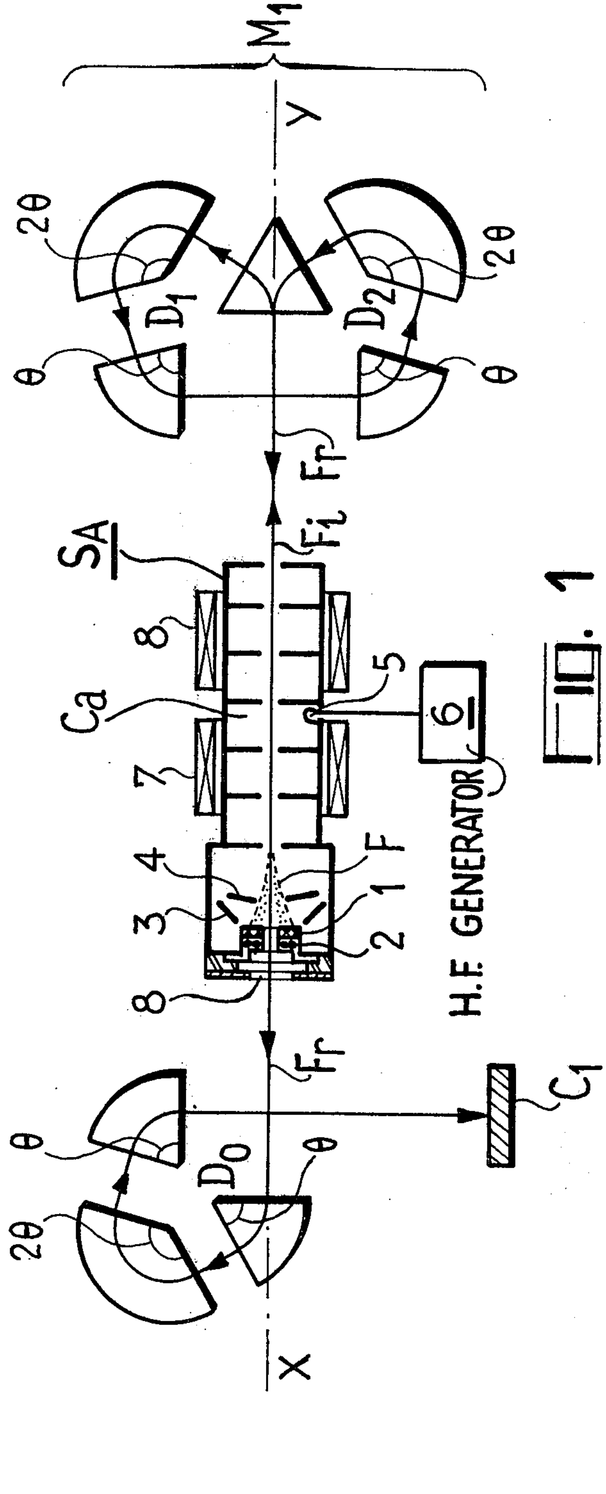
FIGS. 1 and 3 illustrate two embodiments of a linear particle accelerator in accordance with the invention.

— a particule source 1 generating a beam F of charged particles;

— a standing wave accelerating structure $S_A$ constituted by a series of accelerating cavities Ca;

— a coupling system 5 which makes it possible to inject, into the structure $S_A$, electromagnetic energy furnished by a microwave generator 6 (a magnetron for example);

— coils 7 and 8 for magnetic focusing purposes, which focus the beam F along the accelerating structure $S_A$;

— an achromatic and stigmatic magnetic mirror $M_1$ which enables the incident beam $F_i$ to be deflected through such an angle in order to reflect it into the accelerating structure $S_A$ where it is re-accelerated. The magnetic mirror $M_1$, as shown in FIG. 1, is an achromatic and stigmatic mirror constituted by two deflectors $D_1$ and $D_2$ each imparting a deflection of 270° to the beam $F_i$ issuing from the accelerating structure $S_A$, so that the reflected beam $F_r$ is substantially coincidental with the incident beam $F_i$;

— a magnetic deflector $D_o$ making it possible to deflect the reflected beam $F_r$ through 270° for example towards a target $C_1$ after its second pass through the structure $S_A$ and passage through the particle source 1.

The stigmatic and achromatic magnetic deflectors $D_o$, $D_1$ and $D_2$ have been described in U.S. Pat. No. 3,691,374.

Figure 2:
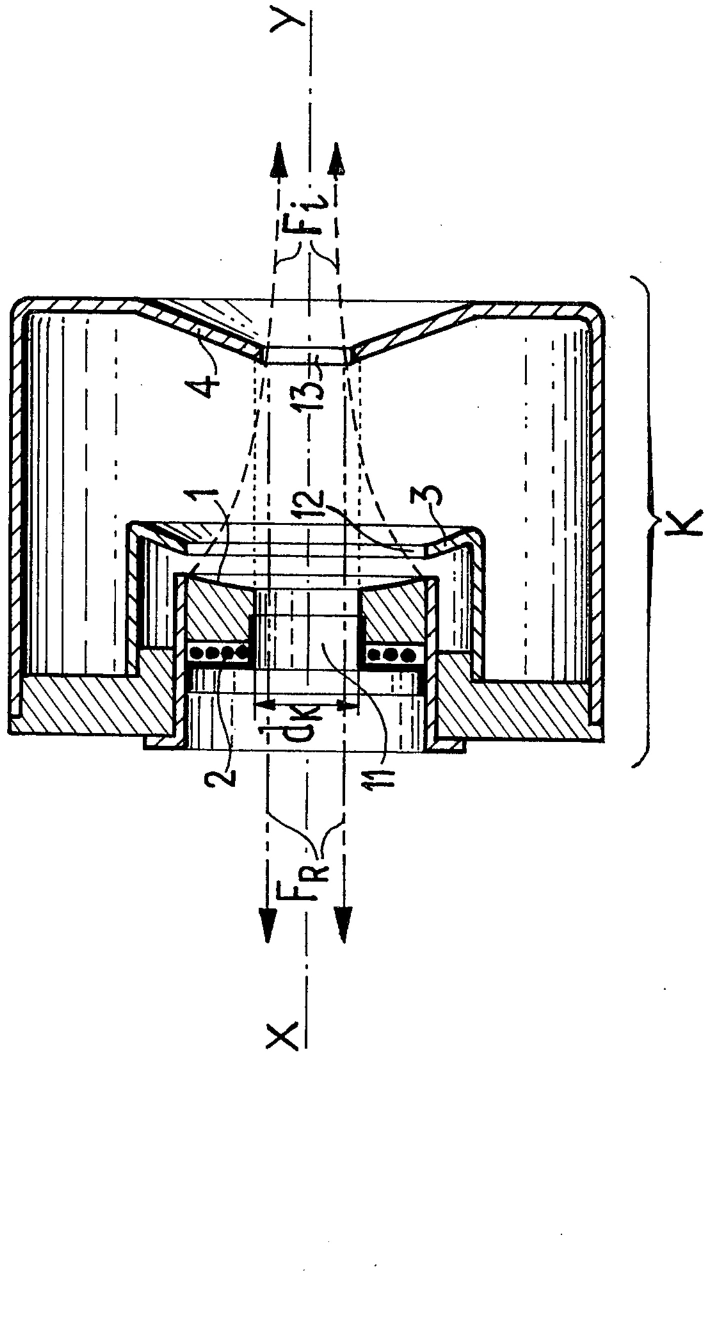
FIG. 2 illustrates an example of a gun having an annular cathode, as used in the accelerator in accordance with the invention.

FIG. 2, shows a particle source which, in this case, is an electron-gun K. The electron-gun K comprises a cathode 1 of annular form, the opening 11 at the centre of which is circular and has a diameter $d_k$ greater than the diameter of the reflected beam $F_r$. The cathode 1 can be indirectly heated by a toroidal filament 2, the central hole being substantially of the same size as the opening 11 in the cathode 1.

Electrodes 3 and 4 for controlling the beam (modulating electrode, anode) are provided, at their centre, with circular openings 12 and 13 to pass the incident beam $F_i$ and the reflected beam $F_r$. The diameter of the opening 13 in the anode 4 is slightly smaller than the diameter $d_k$ of the opening 11 in the centre of the cathode 1, thus forming a screen in order to protect said cathode 1.

Figure 3:
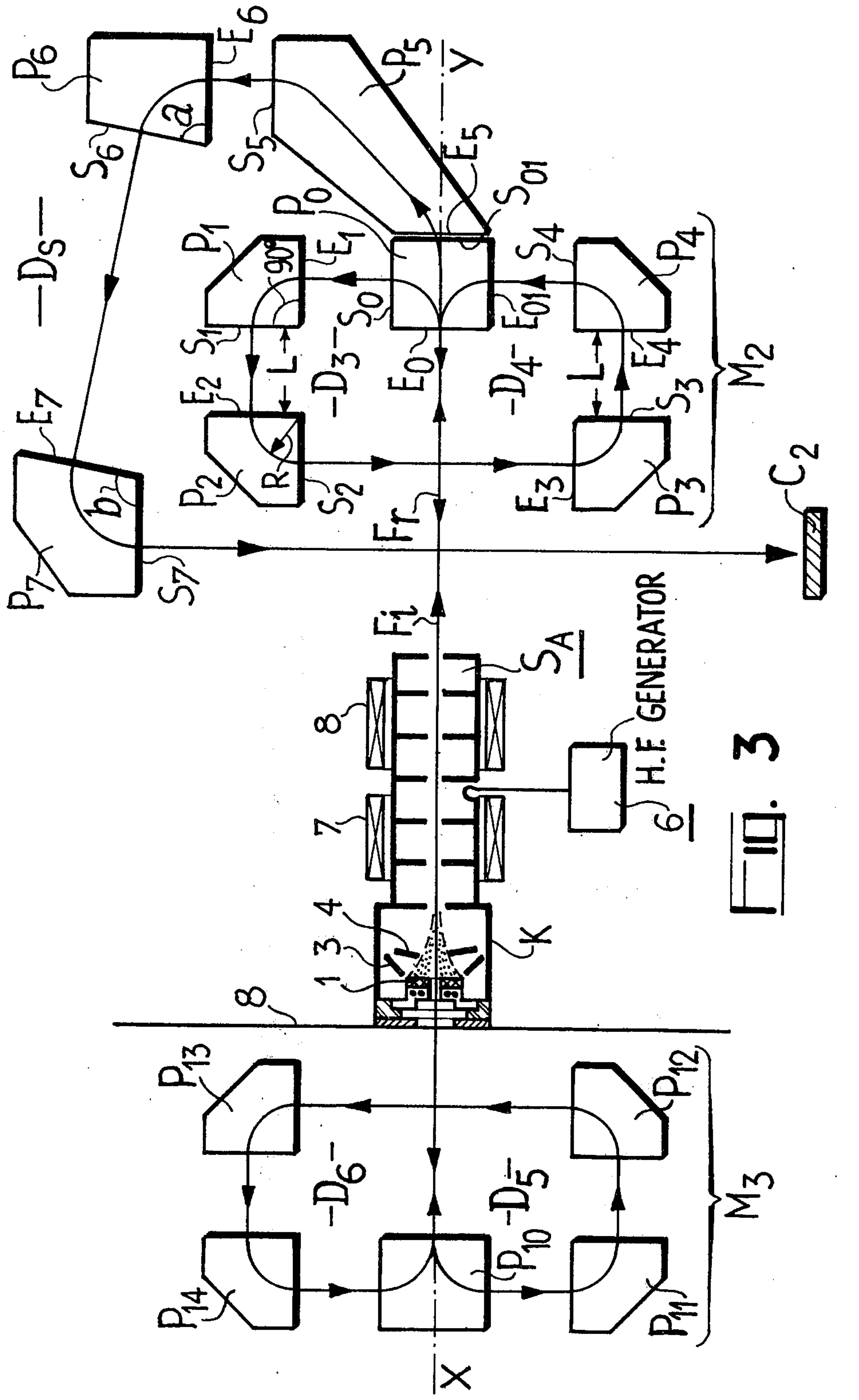

FIG. 3 schematically illustrates another embodiment of a linear accelerator in accordance with the invention. At either side of the accelerating structure $S_A$ which is associated with a particle source K as described earlier, there are respectively arranged magnetic mirrors $M_2$ and $M_3$ each respectively constituted by two deflectors $D_3$, $D_4$ and $D_5$, $D_6$.

The magnetic deflectors $D_3$ and $D_4$, which are achromatic and stigmatic deflectors, each deflect the particle beam $F_i$ through 270°. They are respectively constituted by electromagnets equipped with pairs of polepieces $P_o$, $P_1$, $P_2$ and $P_3$, $P_4$, $P_o$. The polepieces $P_1$, $P_2$, $P_3$, $P_4$ have the form of sectors whose angle is substantially equal to 90° and they are disposed symmetrically in pairs in relation to the axis of the accelerating structure $S_A$ as FIG. 3 shows. These polepieces $P_1$, $P_2$, $P_3$, $P_4$ respectively comprise entry faces $E_1$, $E_2$, $E_3$, $E_4$ and exit faces $S_1$, $S_2$, $S_3$, $S_4$. The electromagnet comprising the polepieces $P_o$ is common to the deflectors $D_3$ and $D_4$. These polepieces $P_o$ have a rectangular shape and have two entry faces $E_o$, $E_{o1}$ and two exit faces $S_o$ and $S_{o1}$. The faces $S_o$, $E_1$ ; $S_1$, $E_2$ ; $S_3$, $E_4$ ; and $S_4$, $E_{o1}$, are arranged in pairs, parallel to each other and are separated by an interval L equal to the radius of curvature R of the mean trajectory of the particle beam deflected by the magnetic field formed respectively between the pairs of polepieces $P_o$, $P_1$, $P_2$, $P_3$, and $P_4$.

The magnetic deflectors $D_5$ and $D_6$, which are achromatic in nature, are respectively constituted by three electromagnets equipped with pairs of polepieces $P_{10}$, $P_{11}$, $P_{12}$ (deflector $D_5$) and $P_{13}$, $P_{14}$, $P_{10}$ (deflector $D_6$), the electromagnet equipped with the polepieces $P_{10}$ being common to the deflectors $D_5$ and $D_6$.

This choice of the shape of the polepieces and parameters defining these deflectors $D_5$, $D_6$, leads to the formation of what are known as "diagonal matrix" deflectors having a single term corresponding to the drift space. These deflectors introduce very small focusing aberrations. Moreover, their size is reduced and their saturation magnetic field remains high.

In operation, the particles issuing from the source 1, and having passed once through the accelerating structure $S_A$, are deflected through 270° by each of the deflectors $D_3$ and $D_4$ and are then returned to the accelerating structure structure $S_A$. After having passed through said structure $S_A$ for a second time, the beam passes through the particle source 1 and is then reflected by the mirror $M_3$ towards the accelerating structure $S_A$ where the particles are accelerated a third time.

The energy of the particles is then such that the beam is no longer reflected by the mirror $M_2$ but enters the exit deflection system $D_S$. This magnetic deflection system $D_S$ is achromatic and stigmatic nature. It is constituted by three electromagnets respectively equipped with pairs of polepieces $P_5$, $P_6$ and $P_7$ whose entry faces $E_5$, $E_6$ and $E_7$ and exit faces $S_5$, $S_6$ and $S_7$ are respectively perpendicular to the mean trajectories of the incident and emergent particle beams. The shape of the polepieces $P_5$ depends upon the energy of the particles passing through them and upon the magnetic field used. In the example shown in FIG. 3, the polepieces $P_6$ are sectors having an angle $a < \pi/2$ whilst the polepieces $P_7$ are sectors having an angle $b > \pi/2$ and the entry face $E_5$ of the polepieces $P_5$ is coincidental with the exit face $S_{01}$ of the polepieces $P_o$.

Moreover, the exit faces $S_5$ and $S_6$ are flat and respectively parallel to the entry faces $E_6$ and $E_7$ which are also flat.

Said exit magnetic deflector $D_S$ makes it possible to suitably focus of non-monokinetic particles on a target $C_2$ arranged on the axis XY of the accelerating structure $S_A$, or off said axis XY (as shown in FIG. 3).

Figure 4:
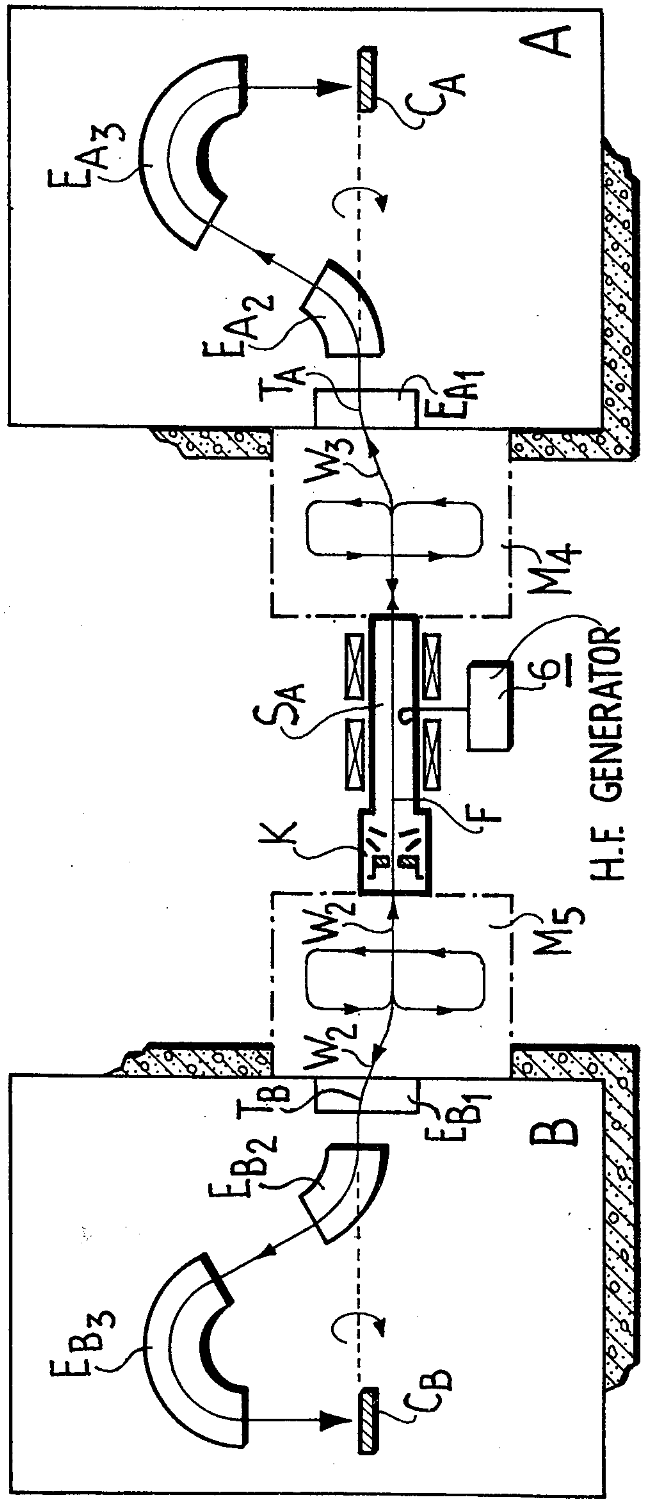
FIG. 4 illustrates an embodiment of an irradiation device operating at two energy levels, utilising a particle accelerator in accordance with the invention.

An accelerator of this kind, in accordance with the invention, thus makes it possible to furnish energies $W_1$, $W_2$, $W_3$ . . . which can be utilised for simultaneously supplying several radiotherapy treatment rooms using irradiating beams having different energies, in the manner shown in FIG. 4.

For example, in order in a treatment room A located at one of the ends of the accelerator in accordance with the invention, to obtain energy particles $W_3$ corresponding to three passes of the particle beam through the accelerating structure $S_A$, it is merely necessary to on the one hand, adjust the magnetic field $H_4$ of the first mirror $M_4$ to a value h sufficiently high for it to be able to reflect the particles of energy $W_1$ (corresponding to a single pass of the particles through the structure $S_A$) and for it to be able to pass the particles of energy $W_3$ (corresponding to three passes of these particles through the accelerating structure $S_A$, these particles thus being totally reflected by the second mirror $M_5$).

Particles of energy $W_3$ enter the room A along a trajectory $T_A$ and can then be deflected towards the target $C_A$.

If another treatment room B is arranged at the other end (at the end where the electron-gun K is located) of the structure $S_A$, then, in this room B, particles of energy $W_2$ (corresponding to two passes of these particles through the accelerating structure $S_A$) can be used. In this case, the magnetic field $H_2$ of the second mirror $M_5$ can alternately adopt values $h_{21}$ and $h_{22}$ ($h_{21}$ being less than $h_{22}$) so that the particle beam of energy $W_2$ is totally reflected by the mirror $M_3$ when $H_2 = h_{22}$ and totally transmitted across the mirror $M_3$ when $H_2 = h_{21}$. The particles then enter the room B along the trajectory $T_B$ which will be deflected towards the target $C_B$ by the electromagnets $E_{B1}$ . . . $E_{B3}$.

The linear accelerator in accordance with the invention has the advantage of allowing easy adjustment of the desired energy.

Taking the case of a beam passing through the accelerating section $S_A$ just once, the energy which is required for the particles is achieved in a conventional manner (variation of the amplitude or phase of the HF energy injected into the accelerating structure $S_A$). For a beam passing several times through the accelerating section $S_A$, in order to regulate the energy to a desired value, it is possible to act upon the magnetic flux B of the deflector devices, a slight variation in the magnetic field producing a phase-shift between the bunches of particles within the beam.

In other words, if r is the radius of curvature of the trajectory in a magnetic mirror $M_4$ (or $M_5$), $\pi$ the wavelength of operation of the accelerator, then the phase variation $\phi$ is given by:

$$d\phi = -\frac{6\pi^2 r}{\lambda}\,\frac{dB}{B}$$

where:

$\lambda = 10$ cm $r = 5$ cm a variation of 1 % in the factor $dB/B$ results in a phase-shift of:

$$D\phi = 8°, 6$$

It is also possible to vary the phase of the particle beam passing through the accelerating structure $S_A$, by modifying the interval separating the mirror (or mirrors) from said structure $S_A$.

The operating parameters of a linear accelerator in accordance with the invention, must be chosen in order to achieve optimum operation, taking account for the phenomenon of automatic compensation of the electrical and magnetic space-charge effects does not exist in the situation where two beams are intersecting. Each of the beams experiences in respect of the other a defocusing magnetic force which is added to the electrical defocusing force due to the space-charge. The electrodes of the particle source will therefore be designed to take account of this phenomenon (the current can be $n$ times the initial current $I_o$ where $n$ is a whole number equal to or greater than 2 and depends upon the number of passes which the beam makes through the accelerating structure $S_A$).

In the accelerating structure, the current will be substantially equal to $(n-1)\,I_o$.

For an accelerated beam having an energy $W_3$ three times the energy $W_1$ corresponding to the energy of the particles after they have effected just one pass through the accelerating structure $S_A$, the high frequency source 6 will in fact experience a load equal to three times that of the current of the accelerated particles. It is therefore necessary to limit said initial current to a third of its value if an accelerator is to be obtained which yields characteristics corresponding to a beam of particles of energy $W_3 \# 3W_1$.

It should be pointed out, finally, that a linear accelerator in accordance with the invention, equipped with two mirrors of the kind $M_2$ constituted by two deflectors $D_3$, $D_4$ as shown in FIG. 3, has certain advantages over an accelerator equipped with mirrors of type $M_1$ constituted by deflectors $D_1$, $D_2$ (FIG. 1). As a matter of fact, these deflectors $D_1$, $D_2$ should have entry and exit faces of curvilinear form to enable aberrations to be compensated, whilst the deflectors $D_3$, $D_4$ have straight entry and exit faces and negligible aberration.

What we claim is:

1. A linear accelerator for accelerating a charged particle beam, comprising a particle source, a linear accelerating structure of axis XY constituted by a succession of resonant cavities, means for the injection of electromagnetic energy into said structure; magnetic deflection means for deflecting said particle beam, said magnetic deflection means comprising at least a first achromatic and stigmatic magnetic mirror capable of reflecting said beam of particles in a direction which is at 180° to the incident direction of the beam, allowing said particle beam to pass at least twice through said accelerating structure; said particle source being arranged on the axis of said accelerating structure; said particle source having a form such that it can be traversed along its axis by said accelerated beam having effected at least two passes through said accelerating structure.

2. A linear particle accelerator as claimed in claim 1, wherein said first magnetic mirror is constituted by a first magnetic deflector ($D_1$) and a second magnetic deflector ($D_2$) making it possible to twice deflect said particle beams through 270° and return it through said accelerating structure $S_1$; a magnetic, achromatic and stigmatic deflector $D_o$ being arranged, upstream of the particle source, in the path of the trajectory of said accelerated beam having effected at least two passes through said accelerating structure, said deflector $D_o$ making it possible to direct said beam on to the target $C_1$ at a predetermined position.

3. A linear particle accelerator as claimed in claim 2, wherein said magnetic deflectors $D_1$ and $D_2$ of said first mirror are constituted by electromagnets whose polepieces take the form of sectors having angles other than $\pi/2$, the magnetic filed of said electromagnets being adjustable in order to make it possible to control the phase of the bunches of particles returned through said accelerating structure $S_A$, in relation to the standing magnetic wave created in said structure $S_A$.

4. A linear particle accelerator as claimed in claim 2, wherein the distance between said first mirror and the accelerating structure $S_A$ is adjustable, making it possible to regulate the entry phase of the bunches of particles returned through said accelerating structure $S_A$.

5. A linear particle accelerator as claimed in claim 1, said linear particle accelerator comprising first and second magnetic mirrors arranged at either side of the assembly formed by said particle source and said accelerating structure $S_A$, the axis of symmetry of each of the mirrors coinciding with the axis of the accelerating structure $S_A$.

6. A linear particle accelerator as claimed in claim 5, wherein said two magnetic mirrors respectively comprise two identical magnetic, achromatic and stigmatic deflectors ($D_1$, $D_2$), each deflecting said particle beam through 270°, said mirrors being constituted by electromagnets having adjustable magnetic fields, the polepieces of said electromagnets taking the form of sectors whose angles are respectively equal to $\Theta$ and $2\Theta$, said angles being different from $\pi/2$, said magnetic fields having values which determine the number of passes of said particle beam through said accelerating structure $S_A$.

7. A linear particle accelerator as claimed in claim 5, wherein said particle source is an electron-gun K arranged between the entry to said accelerating structure and said second mirror, the electron-gun K comprising an annular cathode whose axis coincides with the axis XY of said accelerating structure $S_A$, the central open part of said annular cathode having a diameter such that the beam of accelerated particles reflected by said first mirror, can pass through it without being intercepted, and enter said second mirror.

8. A linear accelerator as claimed in claim 5, wherein said first mirror has a magnetic field value $H_1 = h_1$ such that said particles having energy $W_1$, corresponding to one pass through the accelerating structure $S_A$, are totally reflected by said first mirror and said particles of energy $W_3$, having traversed the accelerating structure $S_A$ three times, are totally transmitted across said first mirror.

9. A linear particle accelerator as claimed in claim 5, wherein said second mirror has a magnetic field $H_2$ being able to alternately adopt the values $h_{21}$ and $h_{22}$, the value $h_{21}$ being less than $h_{22}$, so that the particles having energy $W_2$ is totally reflected by said second mirror for $H_2 = h_{22}$ and totally transmitted across said second mirror for $H_2 = h_{21}$.

10. A linear particle accelerator as claimed in claim 5, wherein said first and second magnetic mirrors respectively comprise two magnetic achromatic and stigmatic deflectors ($D_3$, $D_4$) and $D_5$, $D_6$), each deflecting said particle beam through 270°, said magnetic deflectors $D_3$, $D_4$) and ($D_5$, $D_6$) each being constituted by three electro-magnets taking the form of sectors having angles equal to $\pi/2$.

11. A linear particle accelerator as claimed in claim 10, wherein said first magnetic mirror is associated to a magnetic exit deflector $D_S$, of achromatic and stigmatic design, so that said particles having an energy $W_1$, corresponding to a single pass through said accelerating structure $S_A$, are reflected by said first mirror, and said particles having an energy $W_3$, corresponding to three passes through said accelerating structure $S_A$, pass through said first mirror without being reflected and are deflected towards a target $C_2$ by said exit deflector $D_S$.

12. A linear particle accelerator as claimed in claim 11, wherein said magnetic exit deflector $D_S$ comprises three electromagnets respectively equiped with pairs of polepieces $P_5$, $P_6$, $P_7$ of predetermined shape, the polepieces $P_6$ and $P_7$ taking the form of sectors respectively having angles $a < \pi/2$ and $b > \pi/2$, entry faces $E_5$, $E_6$, $E_7$ of said polepieces $P_5$, $P_6$, $P_7$ being perpendicular to the incident beam, and exit faces $B_5$, $B_6$, $B_7$ being perpendicular to the emergent beam.

* * * * *